June 2, 1970  M. DONZÉ  3,515,189
METHOD OF STARTING A SCARFING PASS

Filed Jan. 8, 1968  2 Sheets-Sheet 1

INVENTOR
MICHEL DONZE
By Young + Thompson
Attys.

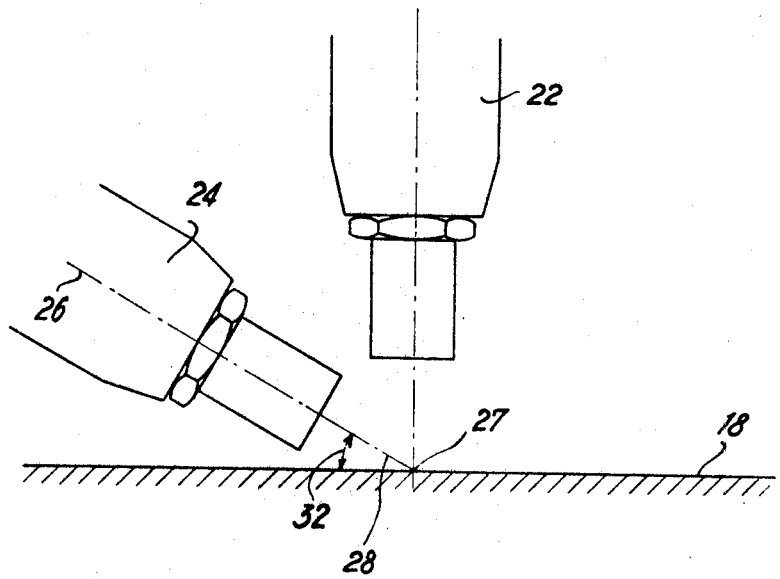
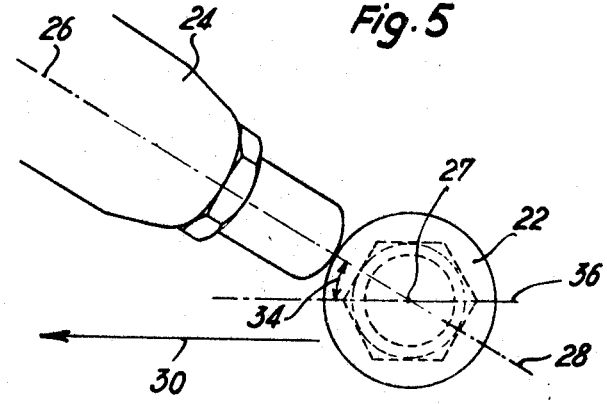

United States Patent Office 3,515,189
Patented June 2, 1970

3,515,189
METHOD OF STARTING A SCARFING PASS
Michel Donzé, Nancy, France, assignor to L'Air Liquide Societe Anonyme, pour l'Etude et l'Exploitation des Procedes Georges Claude
Filed Jan. 8, 1968, Ser. No. 696,439
Int. Cl. B23k 7/00
U.S. Cl. 148—9.5                                                                 11 Claims

ABSTRACT OF THE DISCLOSURE

In order to effect a faultless starting for a scarfing pass, the scarfing torch, initially having its nozzle substantially vertical and its heating flame burning, is rotated about the axis of its nozzle, approaches the workpiece, the oxygen flow being opened, then the torch is inclined, the oxygen flow being brought to its scarfing value.

---

This invention relates to a method of starting, and if necessary modifying the profile of, a scarfing pass carried out by means of a torch.

The present invention relates to a method of starting, and if necessary modifying the profile of, a localised scarfing pass on a massive workpiece carried out by means of a scarfing torch. The torch acts on the workpiece by means of one or more jets of oxygen, by one or more flames the main object of which is to bring the metal to a sufficient temperature for it to burn in the oxygen, and, if appropriate, by auxiliary heating means such as an addition of iron in the form of a powder or tin rod, or a combustible gas, or heating by means of a plasma jet.

It is known to remove surface defects (cracks, faults, burns, inclusions, etc.) in massive workpiece, such as ingots, blooms, slabs, with the use of a scarfing torch. The torch is displaced above the workpiece or, more often, the workpiece is made to pass below the torch, the relative movement being generally parallel to the length of the workpiece since the defects often extend in this direction. However, at the defect region where the work of the torch is to begin, this scarfing results in imperfections: starting holes, sharp edges, or projecting points which imperfections later result in folding etc.

The method according to the invention, which can be used even when the movement of the torch is automatic, obviates these imperfections; it is characterised in that it comprises the following operations, preferably in the order indicated:

(A) The scarfing torch is arranged so that the axis of its nozzle forms an angle of between 70° and 90°, preferably between 85° and 90°, with the surface of the workpiece, the heating flame of the torch is at its intensity proposed for starting scarfing, and the delivery of cutting oxygen may, if necessary, be small or nil.

(B) The said nozzle is given at least one of the following movements, simultaneously or successively if both are required:

(1) Rotation about an axis parallel to the axis of the nozzle or coinciding therewith;

(2) displacement of the torch along the axis of its nozzle to make the nozzle approach the workpiece to be scarfed, the torch possibly accompanying the displacement of the workpiece for a certain time; during this movement or these movements the delivery of cutting oxygen may be modified if necessary, so that the said delivery is given its useful value for scarfing or a lower value but a value other than nil.

(C) The torch is inclined and the delivery of cutting oxygen is brought to its useful value for scarfing if it is not already at this value, and these two operations may be simultaneous or successive, and the said inclination is effected whilst keeping the axis of the torch through one and the same point of the workpiece surfaces.

This method starts the pass perfectly and permits removing metal only to the necessary depth and only at the defective zones. It also permits removing metal from the entire surfare of the workpiere, deepening the pass over crasked regions, regions having inclusions etc.

The accompanying drawings show diagrammatically and by way of non-limitative example one form of embodiment of the method according to the invention. It is assumed, which is the most general case, that the surface to be scarfed is horizontal and that the torch is above the surface.

FIGS. 4 and 5 show the torch in one of the preceding positions and in a subsequent position, respectively in projection on a vertical plane parallel to the plane 26, 28 of FIG. 5, and in plan view.

Figure 1:
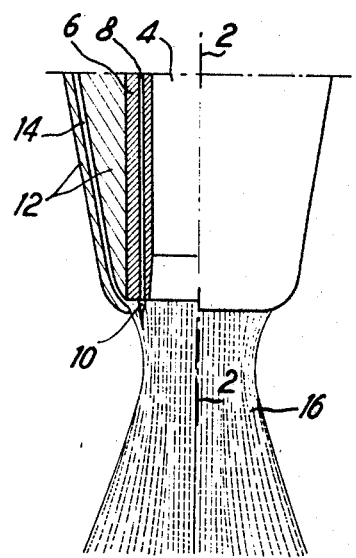
FIG. 1 is an elevational view, partly in section on the plane I—I of FIG. 2, showing the end of a torch which can be used for the method according to the invention.
Figure 2:
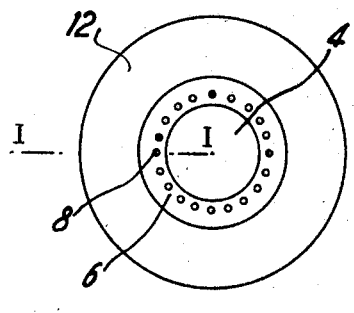
FIG. 2 shows the same end seen from below.

The torch end shown in FIGS. 1 and 2 comprises, starting from its axis 2, 2:

a duct 4 for the scarfing oxygen;
a part 6 perforated with holes such as 8 for the passage of the gas mixture which produces the heating flame such as 10;
a nozzle 12 constituted by two parts between which a passage 14 is situated for an auxiliary heating means, iron powder or combustible gas.

16 represents the flame produced by the combusion of this auxiliary means in a portion of the cutting ovygen.

Figure 3:
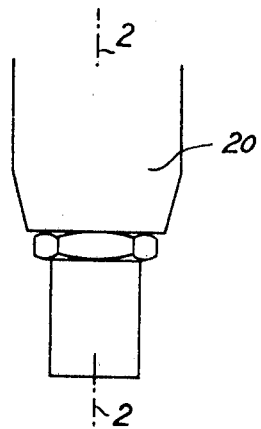
FIG. 3 shows two successive positions for the torch.
Figure 3:
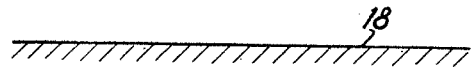

In FIGS. 3, 4, 5 a much greater length of the torch end is shown, but in a very diagrammatic manner. The surface of the workpiece to be scarfed is shown at 18.

At 20, the torch is shown at the instant when it has been to be made to approach the surface 18. The heating flame is at the intensity which it is to have for starting the scarfing operation; the cutting oxygen delivery is small or nil: the axis 2, 2 of the torch is perpendicular to the surface 18 but could form therewith an angle of down to 85° and even 70°. If the control of the operations can be effected with great precision as regards time, the delivery of cutting oxygen may be already considerable at this instant.

At 22, the torch is made to approach the workpiece and has rotated about the axis 2, 2 as indicated by the arrow 23 in order to widen the oxidation path and to give, from the starting of the scarfing operation, a normal pass width without penetrating too far or leaving asperities. This rotational movement may also be effected about an axis parallel to the axis 2, 2. During these approaching and rotational movements, which may be successive or simultaneous, the delivery of cutting oxygen is brought to a value other than nil, a value which may reach the delivery value desired for scarfing.

During these two movements and during the subsequent starting stages the starting of the scarfing operation can be facilitated by means such as:

injection of iron powder or combustible gas through the passage 14;
feeding a steel rod into the flame;
using a plasma jet to heat the zone of the workpiece surface 18 where the scarfing is to begin.

In FIGS. 4 and 5, the position 22 of the torch is again illustrated; at 24 it is shown in one of the positions which it will occupy for the scarfing pass, more particularly at the beginning of the pass.

In order to make the torch move from position 22 to position 24, it is inclined whilst keeping its axis passing through one and the same point 27 in the workpiece.

The angle 32 which the axis 26, 28 of the nozzle forms in position 24 with its projection on the surface of the workpiece is greater than 20°. The angle 34 which the projection of the nozzle axis on this surface forms with a straight line such as 36 parallel to the relative displacement of the workpiece relatively to the torch and contained in this surface, is less than 50°.

During this inclination, which is carried out fairly rapidly, the cutting oxygen delivery is brought to its desired value for scarfing, if it has not already attained the said value.

At the latest when the torch is in position 24, the workpiece is displaced and the heating flames are reduced if necessary. During this displacement, it is possible to modify the angles 32 and 34, the delivery of cutting oxygen and the speed of the workpiece relatively to the torch if it is desired to change the profile, and more particularly the maximum depth and width, of the scarfing pass; thus it is possible to effect selective scarfing, that is to say with more considerable removal of metal at the places which require this, for example to vary the depth of the pass from 0.5 to 15 mm. The torch is shut down to an idling state and returned to the position 20 when the pass is completed.

The method described may be modified without departing from the field of the present invention. For example it is possible to reverse the order of the operations designated as A, B, C. In operation A it is possible to give an auxiliary torch the indicated orientation, in which case the scarfing torch proper already has the orientation which it will have during scarfing.

The machine may comprise a plurality of scarfing torches, the orientations and cutting oxygen deliveries of which may be controlled independently.

What is claimed is:

1. A method for starting a scarfing pass on a massive workpiece with a scarfing torch having a scarfing flame comprising a jet of oxygen and at least one heating flame emerging from a nozzle, comprising the steps of disposing the scarfing torch with the axis of its nozzle at an initial angle of 70° to 90° with the surface of the workpiece and with at least a heating flame emerging from said nozzle, rotating the nozzle about an axis that has substantially no inclination to the axis of the nozzle, and inclining the torch relative to the workpiece at a second angle substantially smaller than said initial angle while maintaining the axis of the nozzle passing through substantially the same point on the surface of the workpiece.

2. A method as claimed in claim 1, said initial angle being 85° to 90°.

3. A method as claimed in claim 1, and displacing the torch along the axis of its nozzle toward the workpiece before said inclination relative to the workpiece.

4. A method as claimed in claim 1, said second angle being greater than 20°.

5. A method as claimed in claim 1, and moving one of said nozzle and workpiece relative to each other along a line that forms an angle of less than 50° with the projection of the axis of the surface of the workpiece.

6. A method as claimed in claim 1, in which the axis about which the nozzle is rotated coincides with the axis of the nozzle.

7. A method for starting a scarfing pass on a massive workpiece with a scarfing torch having a scarfing flame comprising a jet of oxygen and at least one heating flame emerging from a nozzle, comprising the steps of disposing the scarfing torch with the axis of its nozzle at an initial angle of 70° to 90° with the surface of the workpiece and with at least a heating flame emerging from said nozzle, displacing the torch along the axis of its nozzle toward the workpiece and inclining the torch relative to the workpiece at a second angle substantially smaller than said initial angle while maintaining the axis of the nozzle passing through substantially the same point on the surface of the workpiece.

8. A method as claimed in claim 7, said initial angle being 85° to 90°.

9. A method as claimed in claim 7, said second angle being greater than 20°.

10. A method as claimed in claim 7, and moving one of said nozzle and workpiece relative to each other along a line that forms an angle of less than 50° with the projection of the axis of the surface of the workpiece.

11. A method as claimed in claim 7, in which the axis about which the nozzle is rotated coincides with the axis of the nozzle.

References Cited
UNITED STATES PATENTS 2,259,956 10/1941 Jones _____ 148—9.6
2,259,955 10/1941 Jones _____ 148—9.6

L. DEWAYNE RUTLEDGE, Primary Examiner

W. W. STALLARD, Assistant Examiner